(12) United States Patent
    Now

(10) Patent No.: US 7,614,379 B2
(45) Date of Patent: Nov. 10, 2009

(54) AIR HORN FOR EFFICIENT FLUID INTAKE

(76) Inventor: Leo Now, 128 Starlite St., South San Francisco, CA (US) 94080

( * ) Notice: Subject to any disclaimer, the term of this patent is extended or adjusted under 35 U.S.C. 154(b) by 976 days.

(21) Appl. No.: 11/136,279

(22) Filed: May 23, 2005

(65) Prior Publication Data
    US 2006/0278192 A1    Dec. 14, 2006

(51) Int. Cl.
    *F02M 35/10*    (2006.01)
(52) U.S. Cl. .............................. 123/184.53; 123/184.56
(58) Field of Classification Search ............ 123/184.53, 123/184.56
    See application file for complete search history.

(56) References Cited
    U.S. PATENT DOCUMENTS
    4,754,927 A * 7/1988 Fitzgerald .............. 239/265.17
    5,947,072 A * 9/1999 Loy et al. .............. 123/184.56

* cited by examiner

*Primary Examiner*—Bena Miller
    (74) *Attorney, Agent, or Firm*—DLA Piper LLP (US)

(57) ABSTRACT

A method, device, and system for controlling a flow of a fluid moving through a pipe are presented. The device includes a truncated cone having a first diameter at an inlet and a second diameter at an outlet and a bracket attached to the truncated cone. The first diameter of the truncated cone is larger than the second diameter. The bracket is a curved sheet positioned around at least a part of the truncated cone and having an adjustable bracket diameter. The bracket diameter is measured from a center axis extending through a center of the truncated cone. Attaching the device to a fluid flow pipe reduces turbulence in the flow through the pipe, allowing a more streamlined fluid exit from the pipe. When used with an air intake pipe for an internal combustion engine, the device allows more horsepower and mileage to be extracted from the engine.

22 Claims, 11 Drawing Sheets

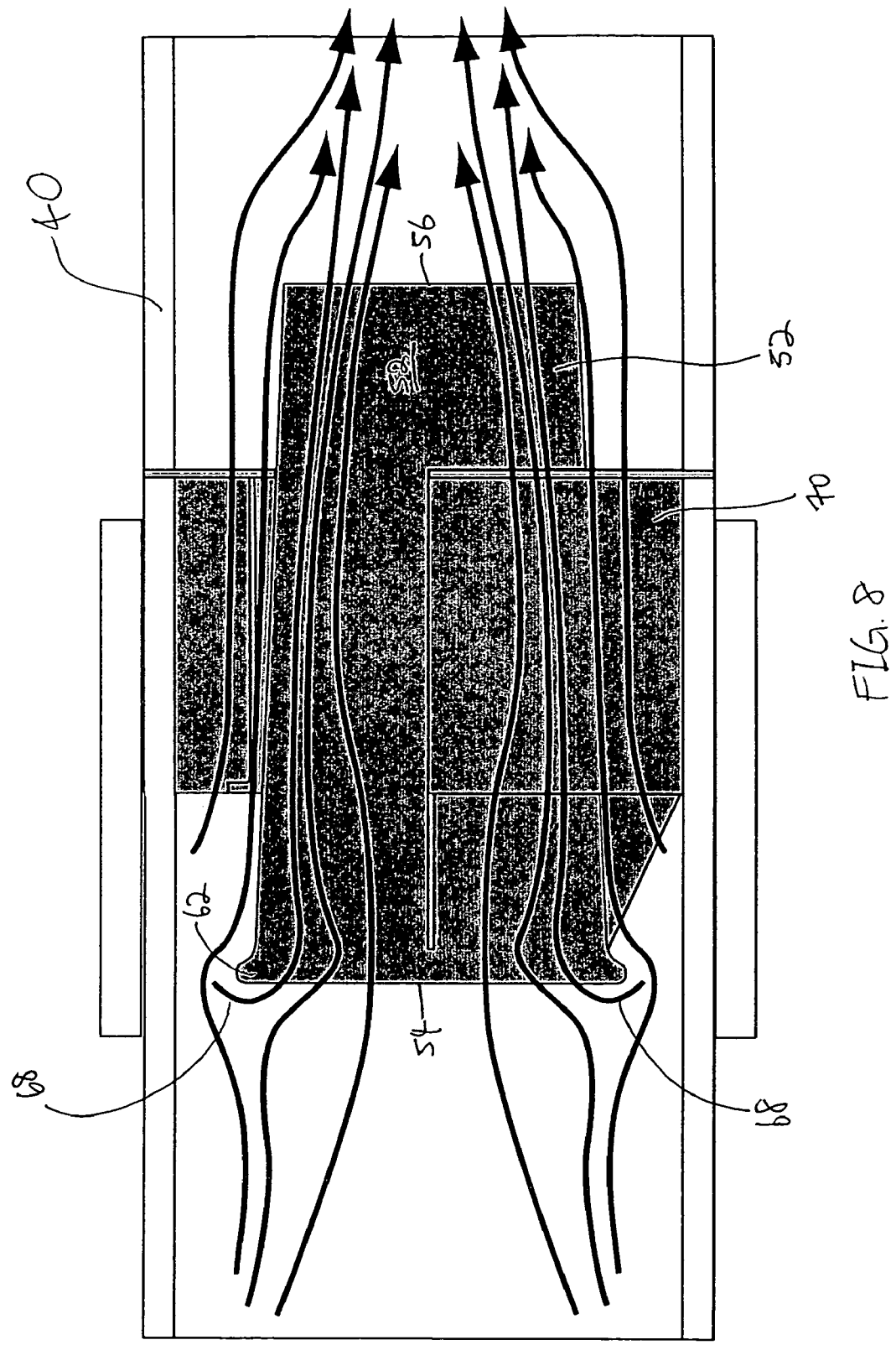

AIR HORN FOR EFFICIENT FLUID INTAKE

FIELD OF THE INVENTION

The invention relates generally to a system and method for directing a fluid flow and in particular to a system and method for directing a fluid in an internal combustion engine.

BACKGROUND OF THE INVENTION

It is well known that internal combustion engines require a flow of air to operate. In particular, the air and fuel are mixed together and then ignited to generate energy which translates into power, for example, to move a piston up. An internal combustion engine may be used for a variety of different purposes that involve energy generation, including but not limited to powering a vehicle. The performance of the engine is affected by various factors such as the composition of the air, the manner (e.g., velocity) in which the air is supplied to the internal combustion engine, and the temperature and pressure of the air supply.

Enhancing the performance of an internal combustion engine entails generating more horsepower and/or getting more mileage out of a given amount of fuel supply. One way to enhance the performance of an internal combustion engine is to adjust the temperature and the amount of air being supply. For example, an automobile may be "turbo charged," in which the incoming air is compressed and then fed into the internal combustion engine. The turbo charging of an internal combustion engine, however, is expensive and difficult to install for anyone other than an experienced mechanic. A less expensive option is to attempt to lower the temperature of the incoming air while at the same time increasing the air flow. This can be accomplished using after-market add on components which replace the original gas intake pipe. One example of a known system is made by AEM Power, Inc. (http://www.aempower.com). According to AEM Power, this system creates multiple frequency sound waves to help charge the cylinders with air in the upper engine RPM region. According to AEM Power, a shorter secondary pipe generates high frequency sound waves with higher engine RPMs and the smaller, longer primary pipe generates lower frequency sound waves at lower engine RPMs. This system does result in an increase in engine horsepower and torque. However, the horsepower and torque gain from the AEM V2 Intake System can still be further increased.

Thus, it is desirable to provide a method and device that allows the extraction of more horsepower and mileage out of a given amount of fuel supply.

SUMMARY

In one aspect, the invention is a device for controlling a flow of a fluid moving through a pipe. The device includes a truncated cone having a first diameter at an inlet and a second diameter at an outlet and a bracket attached to the truncated cone. The first diameter of the truncated cone is larger than the second diameter. The bracket is a curved sheet positioned around at least a part of the truncated cone and having an adjustable bracket diameter. The bracket diameter is measured from a center axis extending through a center of the truncated cone.

In another aspect, the invention is a fluid flow system that includes a pipe through which the fluid flows and the above device for controlling the flow of a fluid moving through the pipe.

In yet another aspect, the invention is a method of controlling a fluid flow through a pipe. The method includes attaching a truncated cone to an exit end of the pipe, intaking the fluid through an inlet of the truncated cone, wherein the inlet has a first diameter, and exiting the fluid through an outlet of the truncated cone. The outlet has a second diameter that is smaller than the first diameter.

The invention also includes method of making a device that controls fluid movement through a pipe. The method includes forming a truncated cone having a first diameter at an inlet and a second diameter at an outlet, and forming a bracket around the truncated cone. The first diameter is larger than the second diameter. The bracket is a curved sheet positioned around at least a part of the truncated cone and having an adjustable bracket diameter, wherein the bracket diameter is measured from a center axis extending through a center of the truncated cone.

BRIEF DESCRIPTION OF THE DRAWINGS

FIG. 8 is a cross sectional view of the interface between the air intake pipe and the air horn, and shows the flow of air through the air horn.

DETAILED DESCRIPTION OF EMBODIMENTS

The invention is particularly applicable to an air intake pipe for an internal combustion engine, such as a vehicle engine, and it is in this context that the invention will be described. It will be appreciated, however, that the air intake pipe and method in accordance with the invention has greater utility since it may be used with various different fluids for various different purposes, and is not limited to use with only air.

Figure 1:
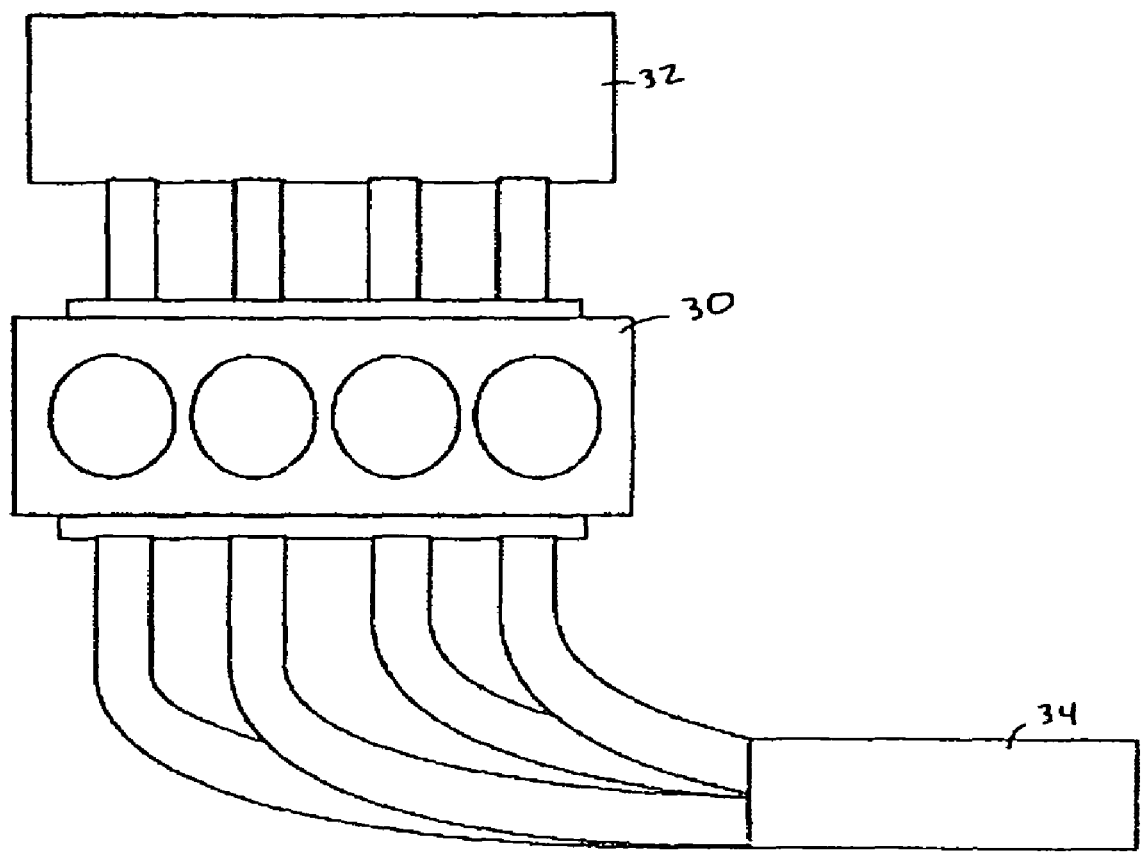
FIG. 1 is a diagram illustrating a typical gas directing manifold.

FIG. 1 is a diagram illustrating a typical internal combustion engine 30. In particular, FIG. 1 illustrates a typical internal combustion engine 30 with a typical gas directing manifold 32 and a typical exhaust manifold 34, as are well known.

The gas directing manifold 32 provides air into the internal combustion engine so that it can be mixed with fuel and ignited while the exhaust manifold 34 generates a slight back pressure and exhausts the exhaust gases out of the internal combustion engine 30.

Figure 2:
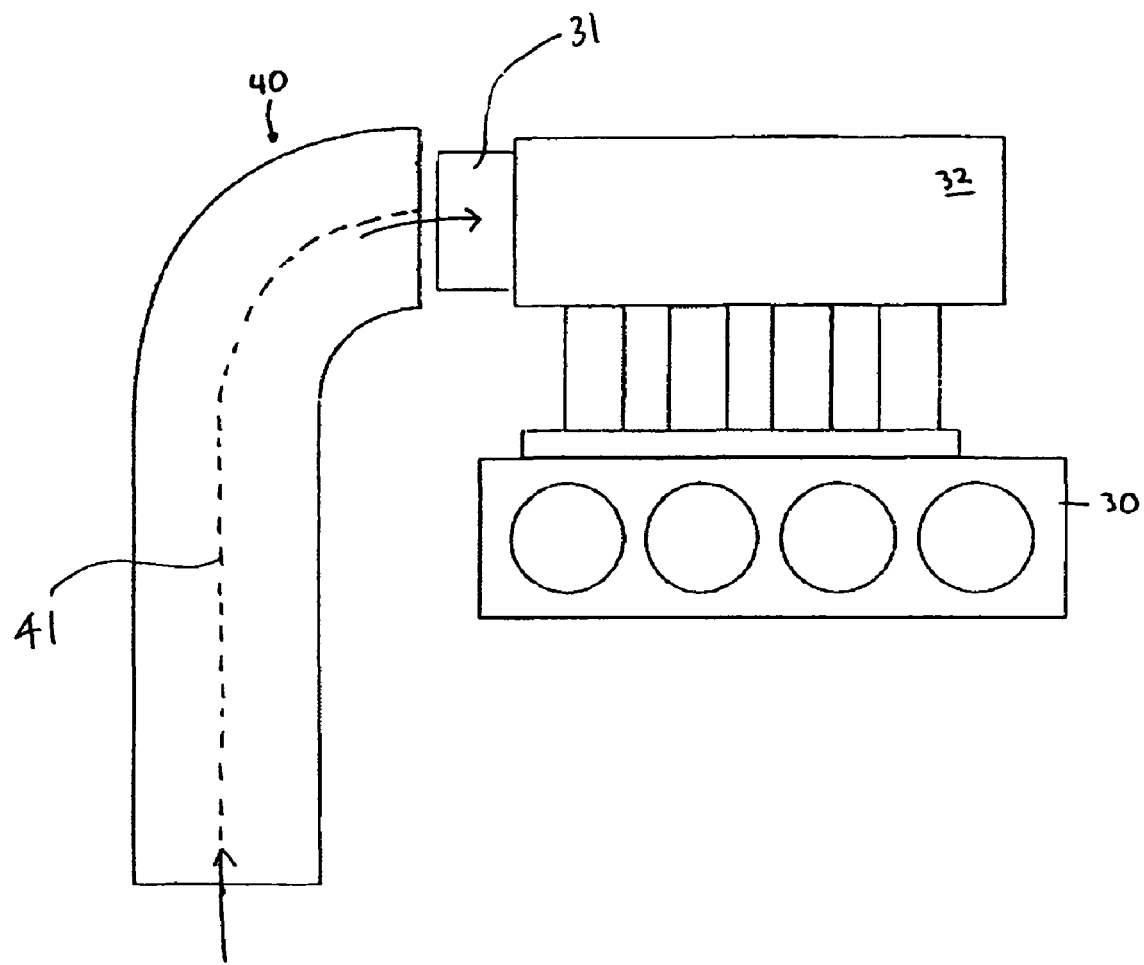
FIG. 2 is a diagram illustrating a typical arrangement of an air intake pipe and the gas directing manifold.

FIG. 2 is a diagram illustrating an air intake pipe 40 that is arranged to supply air to the gas directing manifold 32 of FIG. 1. The air intake pipe 40 fits onto a typical gas directing manifold 32 through a throttle body 31 so that a fluid (e.g., air) exiting the air intake pipe 40 enters the internal combustion engine 30 in this embodiment. The air intake pipe 40 directs the air from an air box (not shown) to the gas directing manifold 32, as shown by the arrows. The gas intake pipe 40 has a center axis 41 extending through the center of every circular cross section along its length.

Figure 3:
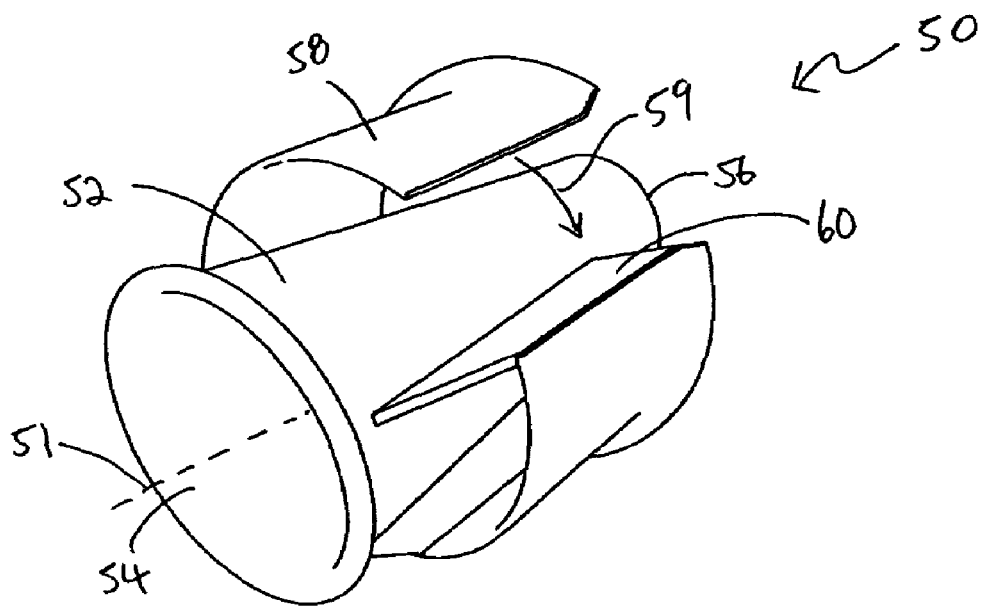
FIG. 3 is a perspective view of an air horn that is designed to fit with the air intake pipe of FIG. 2 according to the invention.

FIG. 3 is a perspective view of an air horn 50 that is designed to fit with the air intake pipe 40 to control the air flow into the gas directing manifold 32 according to a first embodiment of the invention. Specifically, this first embodiment is designed to fit at the exit end of the air intake pipe 40. If the internal combustion engine 30 is in a vehicle, increasing the velocity of the air flow results in increased horsepower and higher gas mileage per fuel volume for the vehicle. As shown, the air horn 50 has the general shape of a truncated cone 52, or a cone with the pointed end truncated off. Thus, an inlet 54 and an outlet 56 have different diameters. To achieve the increase in air velocity, the inlet 54 is of a larger diameter than the outlet 56. The truncated cone 52 has a center axis 51 extending through the center of its every circular cross section.

A bracket 58 is formed around the truncated cone 52. The bracket 58 is designed so that its diameter is adjustable, its purpose being to allow the air horn 50 to securely fit with air intake pipes of different sizes. The truncated cone 52 and the bracket 58 may be made of the same material or different materials. The diameter of the bracket 58 (as measured from the center axis 51) is adjusted by moving a first end 65 and a second end 66 of the curved sheet closer together, in the direction shown by the arrow 59. When no force is applied to the air horn 50, the bracket 58 is in its "natural" state where the first end 65 is separated from the second end 66 by a certain distance. In the embodiment shown, the first end 65 is fixed in its position by a prong 60, and the second end 66 is free to move closer to the first end 65. The bracket 58 is made of a material that is hard enough to sustain its shape but flexible enough that the second end 66 can be moved closer to the first end 65 by applying an inward pressure. The material making up the bracket 58 has a memory such that when it is in the "squeezed" state, it wants to revert back to the natural state. Thus, when the bracket 58 is fit into a pipe in the "squeezed" state, the outward force created by the bracket's desire to expand back to its natural state securely fixes the air horn 50 to the pipe. Exemplary materials that are suitable for the truncated cone 52 and the bracket 58 include stainless steel, aluminum, and injected plastic.

Figure 4:
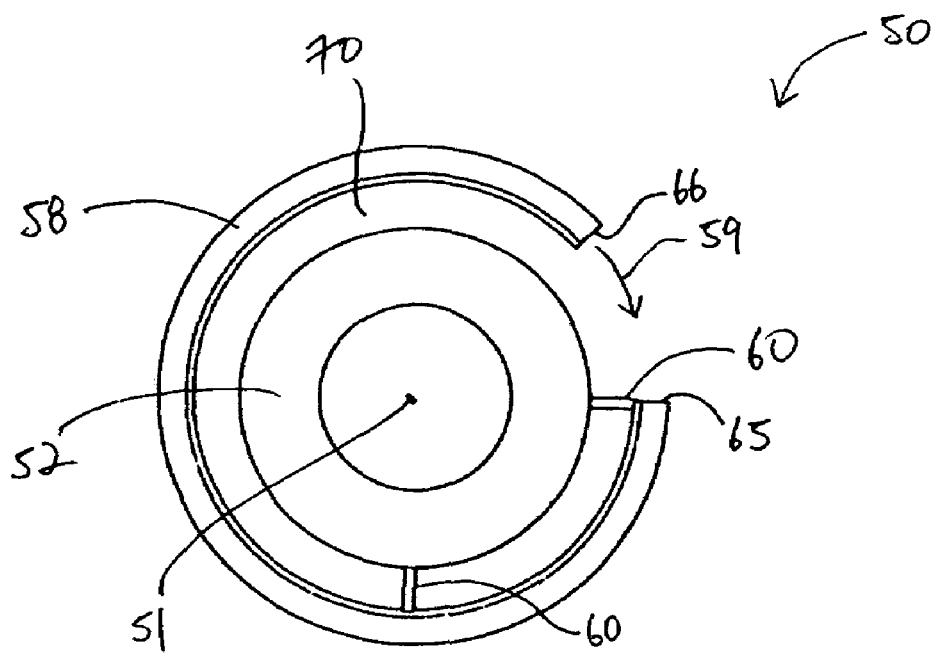
FIG. 4 is a view from one end of the air horn looking into the air horn.

FIG. 4 is a view from one end of the air horn 50 looking into the air horn 50. In the embodiment shown, the bracket 58 is attached to the truncated cone 52 with prongs 60. Although the invention is not limited to a certain number of prongs 60, the prongs 60 provide a secure attachment of the bracket 58 to the cone 52 while allowing the diameter of the bracket 58 to be adjusted by "squeezing" the bracket 58 to move the loose end of the bracket sheet in the direction indicated by the arrow. In this embodiment, the prongs 60 connect the inner surface of the bracket 58 to the outer surface of the truncated cone 52.

Figure 5:
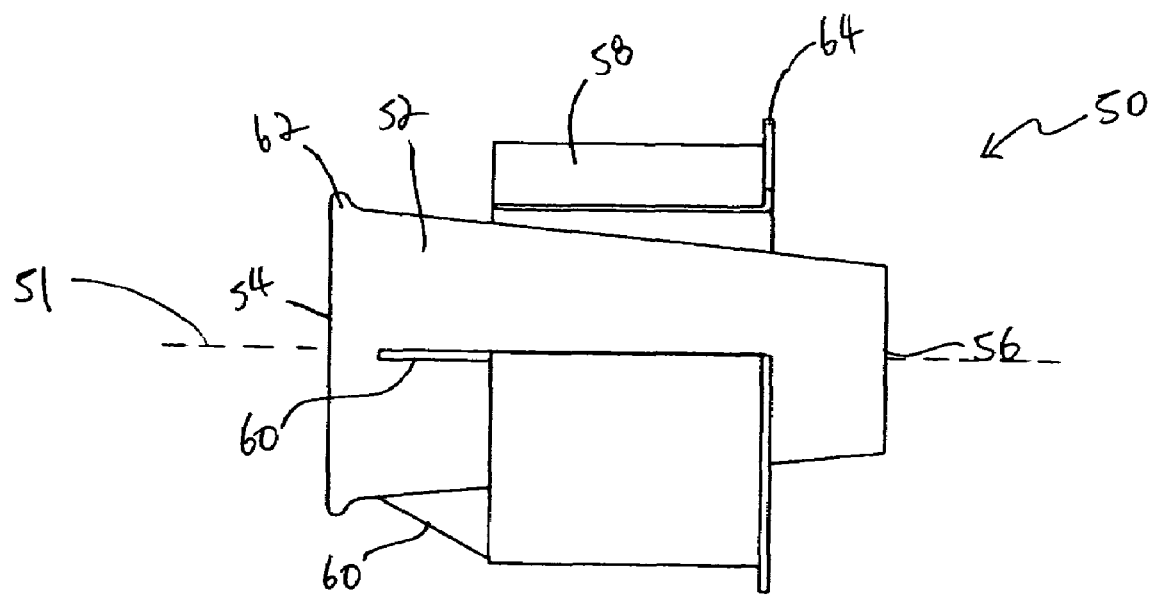
FIG. 5 is a side view of the air horn.

FIG. 5 is a side view of the air horn 50. The side view shows that the truncated cone 52 has a lip 62 at the intake end 54 to help gather more air for intake. A flange 64 located at an edge of the bracket 58 that is closest to the output end 56 controls how much of the air horn 50 is inserted into the air intake pipe 40 by stopping the insertion. Any conventional type of safety mechanism other than the flange 64 may be used either in place of or in addition to the flange 64 to ensure that a user will not push the entire air horn 50 into the gas intake pipe 40 too deep, making it difficult to remove the air horn 50 later.

FIG. 5 also shows that the prong 60 is longer than the bracket 58 when measured in the direction of the center axis 51. This is a design decision specific to the shown embodiment that provides extra security to the attachment of the bracket 58 to the truncated cone 52, and is not a limitation of the invention.

Figure 6:
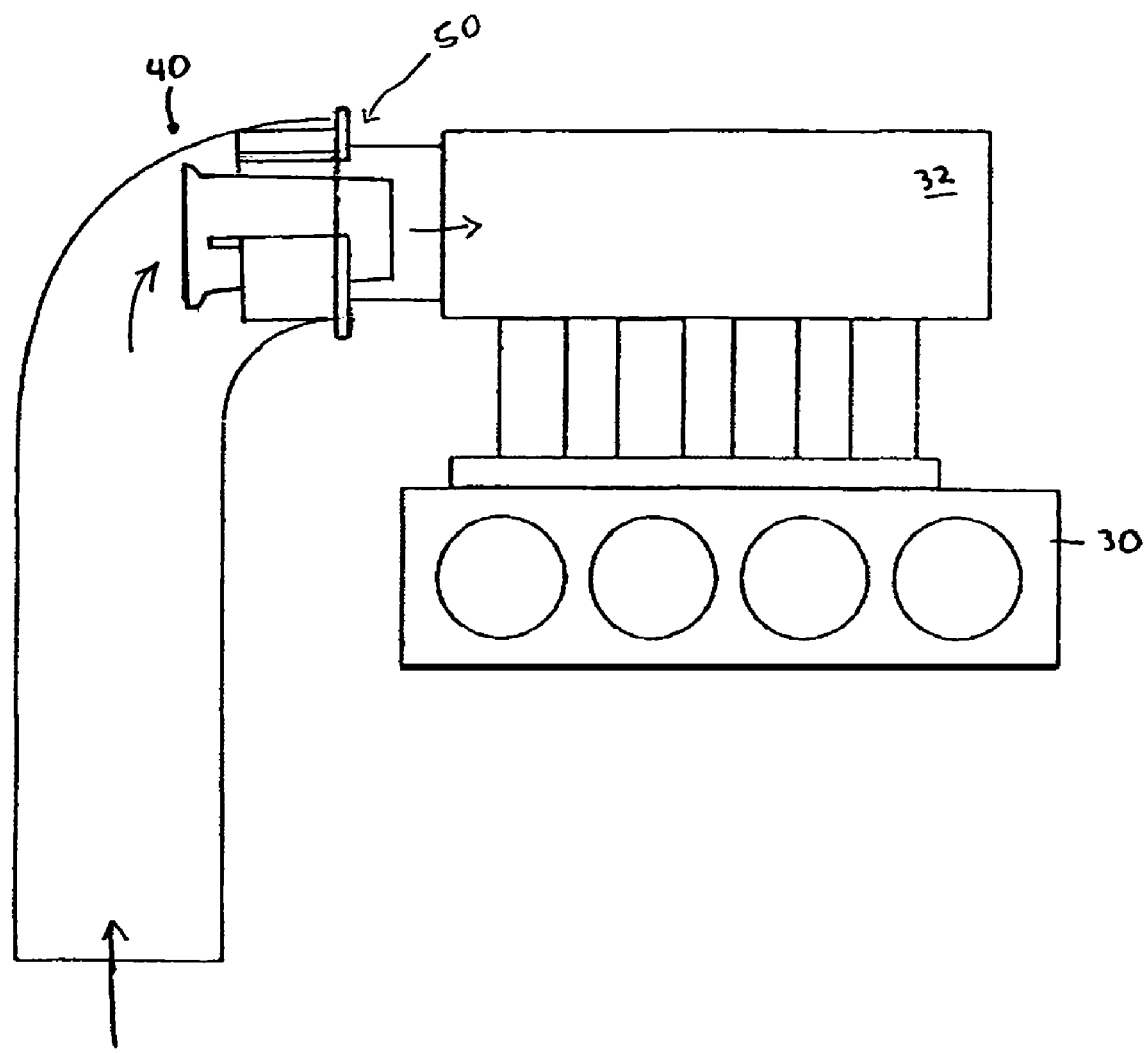
FIG. 6 is a diagram of the air horn in combination with the air intake pipe.

FIG. 6 is a diagram of the air horn 50 in combination with the air intake pipe 40. As shown, the air horn 50 is positioned near the outlet of the air intake pipe 40, near the interface between the air intake pipe 40 and the gas directing manifold 32. Preferably, the center axis 41 of the air intake pipe 40 and the center axis 51 of the air horn 50 are aligned when the two pieces are combined. Typically, the diameter of an air intake pipe 40 is between the ranges of about 2 inches and 4 inches. The air horn 50 is designed to fit securely into the air intake pipe 40. Generally, the longer the air horn 50 and the greater the difference is between the inlet diameter and the outlet diameter, the more dramatic the effect will be of the horsepower increase that is achieved. However, because the air horn 50 is designed to be positioned in the space between the air intake pipe 40 and the gas directing manifold 32, it can only be made so long. The air horn 50 is preferably as long as it is allowed to be given the space constraints.

Figure 7A:
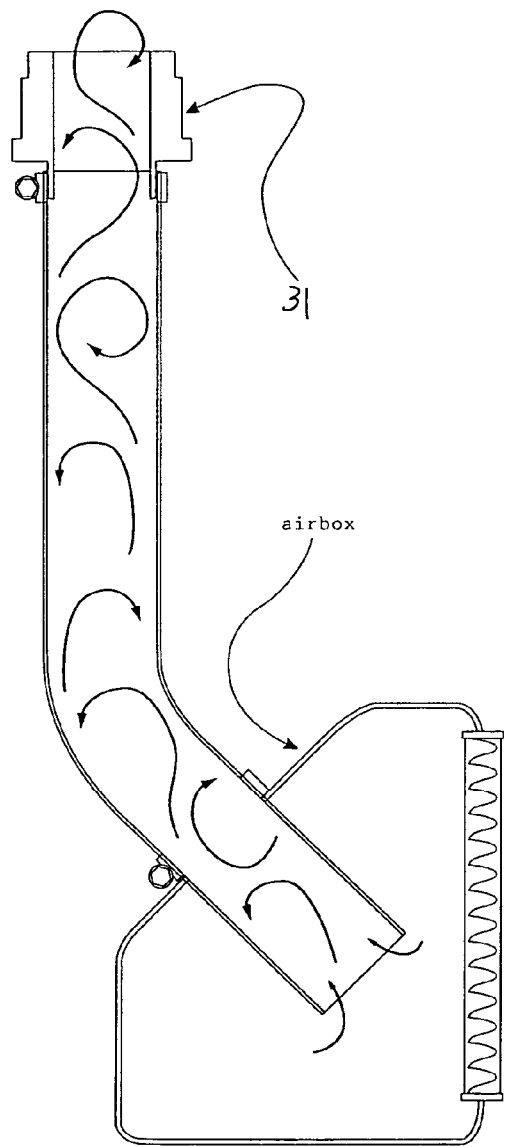
FIG. 7A is a cross section of the air intake pipe showing the airflow through the air intake pipe in the absence of the air horn.

FIG. 7A is a cross section of the air intake pipe 40 showing the airflow through the air intake pipe 40 in the absence of the air horn 50. As shown by the arrows, air passing through the air intake pipe 40 experiences much turbulence, and the flow is not streamlined. The turbulence inside the air intake pipe 40 results in inefficient feeding of air to the gas directing manifold 32 through the throttle body 31, which compromises the horsepower output of the internal combustion engine 30.

Figure 7B:
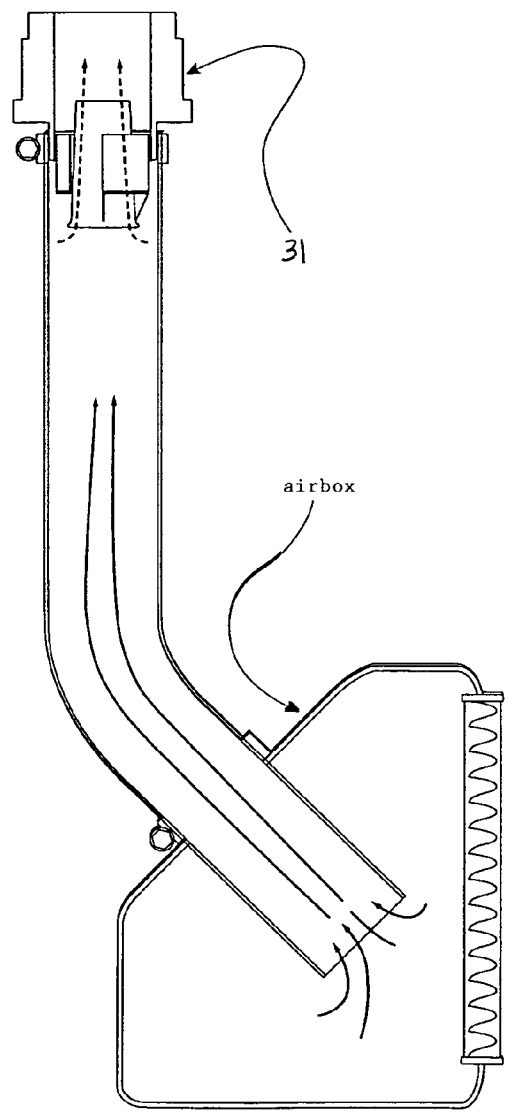
FIG. 7B is a cross section of the air intake pipe showing the airflow through the air intake pipe when the air horn is positioned near the outlet of the air intake pipe.

FIG. 7B is a cross section of the air intake pipe 40 showing the airflow through the air intake pipe 40 when the air horn 50 is positioned near the exit end of the air intake pipe 40. As shown, the air flow through the air intake pipe 40 is streamlined when the air horn 50 is added to the air intake pipe 40. The air horn 50 decreases the turbulence in the air flow through the air intake pipe 40 and allows a more efficient feeding of the air to the gas directing manifold 32.

FIG. 8 is a cross sectional view of the interface between the air intake pipe 40 and the air horn 50 placed at the exit end of the intake pipe 40, and shows the flow of air through the air horn 50. As shown by arrows 68, the lip 62 at the edge of the truncated cone 52 pulls in air that would have otherwise flowed outside the truncated cone 52 through the gap 70. Thus, the lip 62 increases the amount of air that is forced through the truncated cone 52. The narrowing of the cone diameter as the air flows through the cone 52 results in the air velocity increasing as it approaches the outlet end 56. This increase in air velocity creates a lower pressure near the outlet end 56 than at the inlet end 54, and this pressure difference "pulls" more air through the air horn 50 and into the internal combustion engine 30. As a result, the overall air flow rate through the air intake pipe 40 is increased, resulting in the generation of increased horsepower.

The air flow that does not enter the truncated cone 52 is guided through the gap 70 between the bracket 58 and the outer surface of the truncated cone 52, partly guided by the Coanda effect around the curves of the lip 62. Due to the sloping of the truncated cone's sidewall, the gap 70 gets bigger through the length of the air horn 50. Due to this increase in the gap 70, the velocity of the air that travels through the region 70 decreases as it travels through the gap 70. As a result, the velocity of the air in the region 70 near the outlet end 58 is slower than the velocity of the air exiting the truncated cone 52. According to Bernoulli's principle, the pressure of the slow-traveling air in the gap 70 near the outlet end 56 is higher than the pressure of the fast-traveling air exiting the truncated cone 52. This pressure difference results in the air flow being "forced" toward the center axis 41, streamlining the flow and "shooting" the air into the internal combustion engine 30 in more focused manner than if there were no air horn 50. Due to the fast-traveling air coming out of the outlet 56, the overall velocity of the air that is fed to the gas directing manifold 32 is faster than if there were no air horn 50. The overall effect of this "shooting" is increased horsepower generation and an improved gas mileage per fuel supply volume.

In an exemplary embodiment, the inner diameter at the inlet 54 is about ½ inch larger than the diameter at the outlet 56. Some exemplary dimensions of the air horn 50 are summarized in the following table:

| Pipe size (pipe diameter in inches) | Inlet diameter (inches) | Outlet diameter (inches) |
|---|---|---|
| 2.5~2 | 1.5 | 1 |
| 2.5~3 | 2 | 1.5 |
| 3~3.5 | 2.5 | 2 |
| 3.5~4 | 3 | 2.5 |

Figure 9:
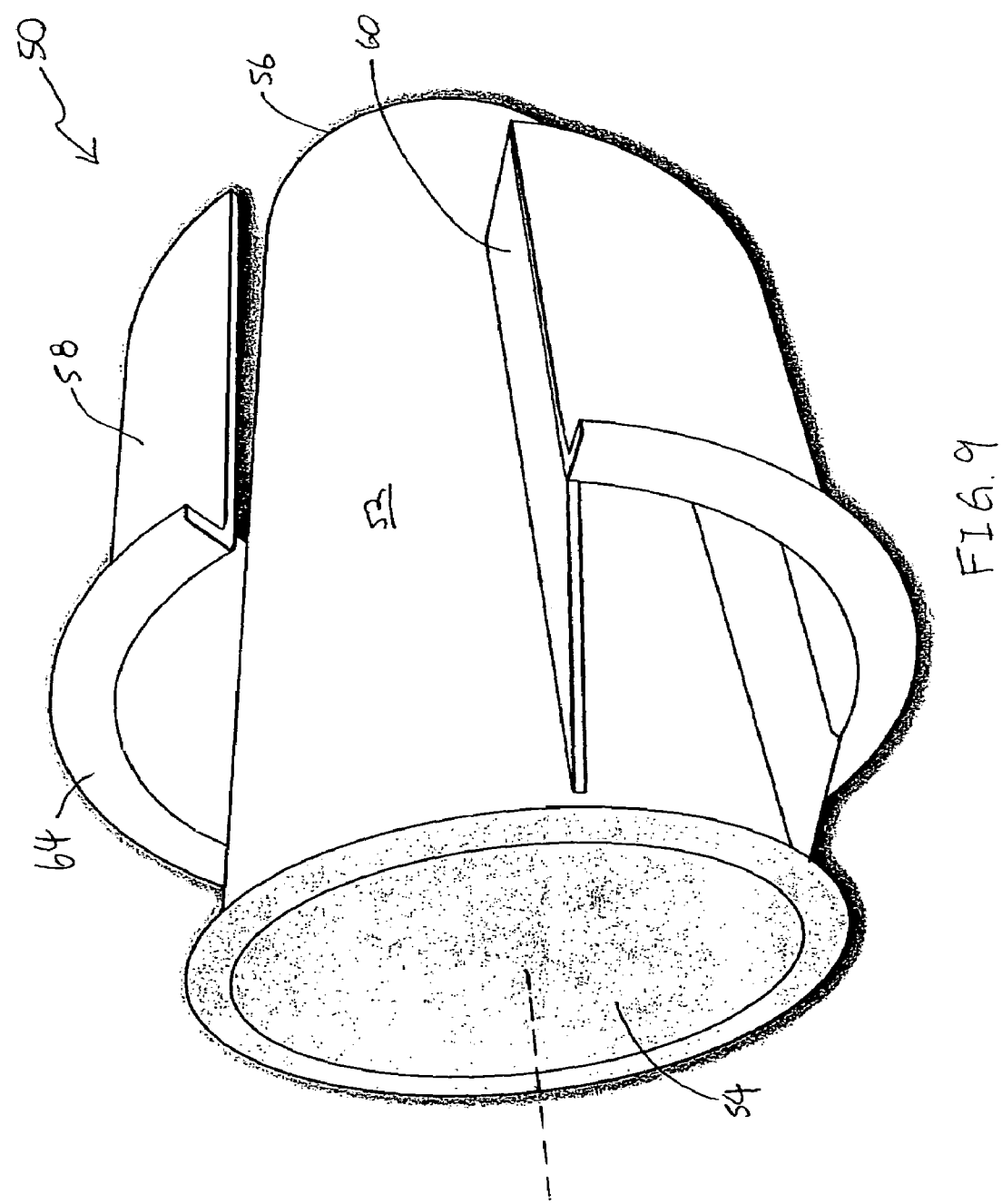
FIG. 9 is a perspective view of an air horn that is designed to fit with the air intake pipe according to a second embodiment of the invention.

FIG. 9 is a perspective view of an air horn 50 that is designed to fit with the air intake pipe 40 according to a second embodiment of the invention. Specifically, this second embodiment is designed to fit at the intake end of the intake pipe 40. Like the air horn 50 of the first embodiment, the air horn 50 of the second embodiment has the truncated cone 52 and an inlet 54 and an outlet 56 that have different diameters. Also, like the air horn 50 of the first embodiment, the air horn 50 of the second embodiment has the bracket 58 that is attached to the truncated cone 52 with at least one prong 60. The bracket 54 in this second embodiment is similar to the bracket 54 of the first embodiment except that the flange 64 is located at the edge of the bracket 54 that is nearest the inlet 54 not nearest the outlet 56 as in the first embodiment.

Figure 10:
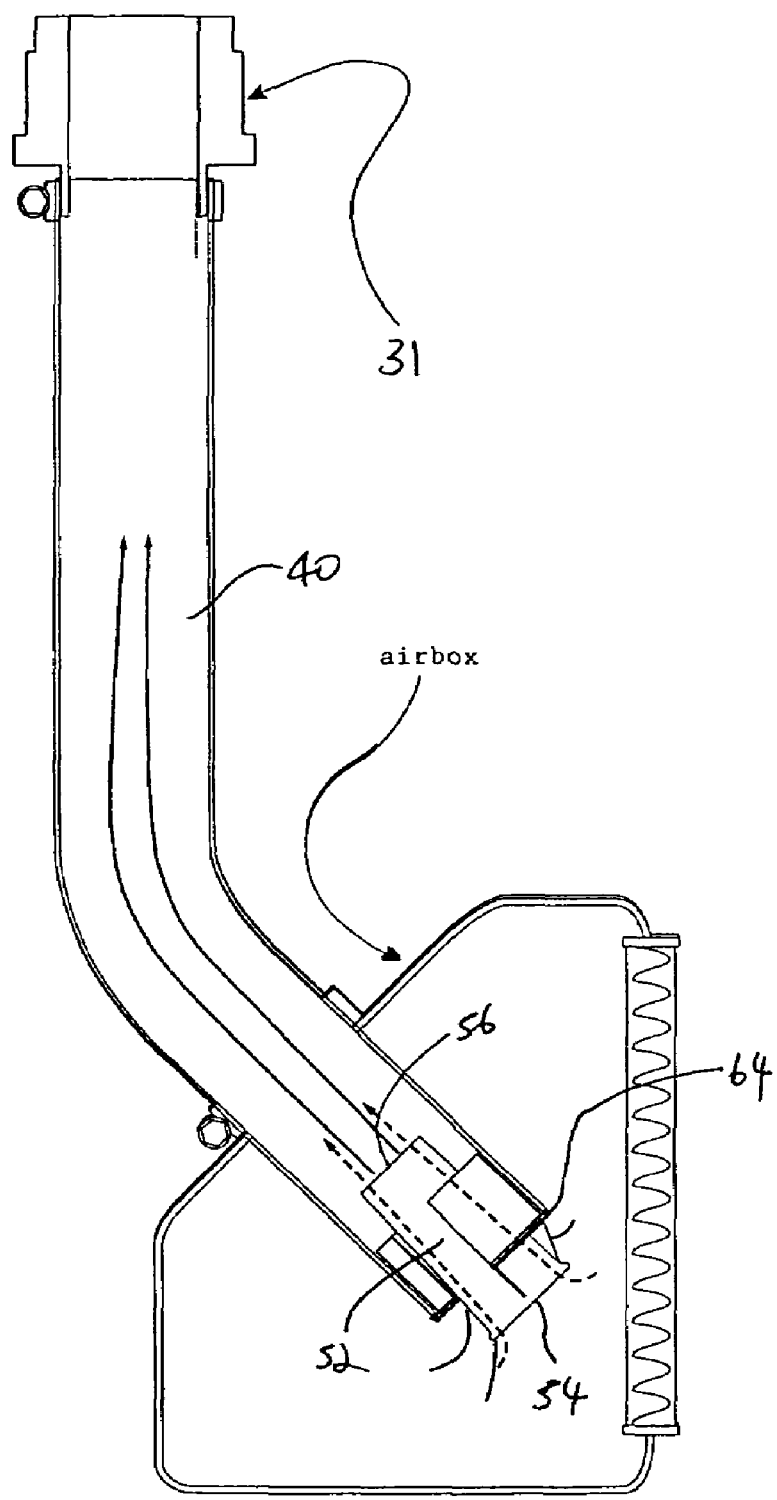
FIG. 10 is a cross section of the air intake pipe showing the airflow through the air intake pipe when the air horn is positioned near the intake end of the air intake pipe.
Figure 12:
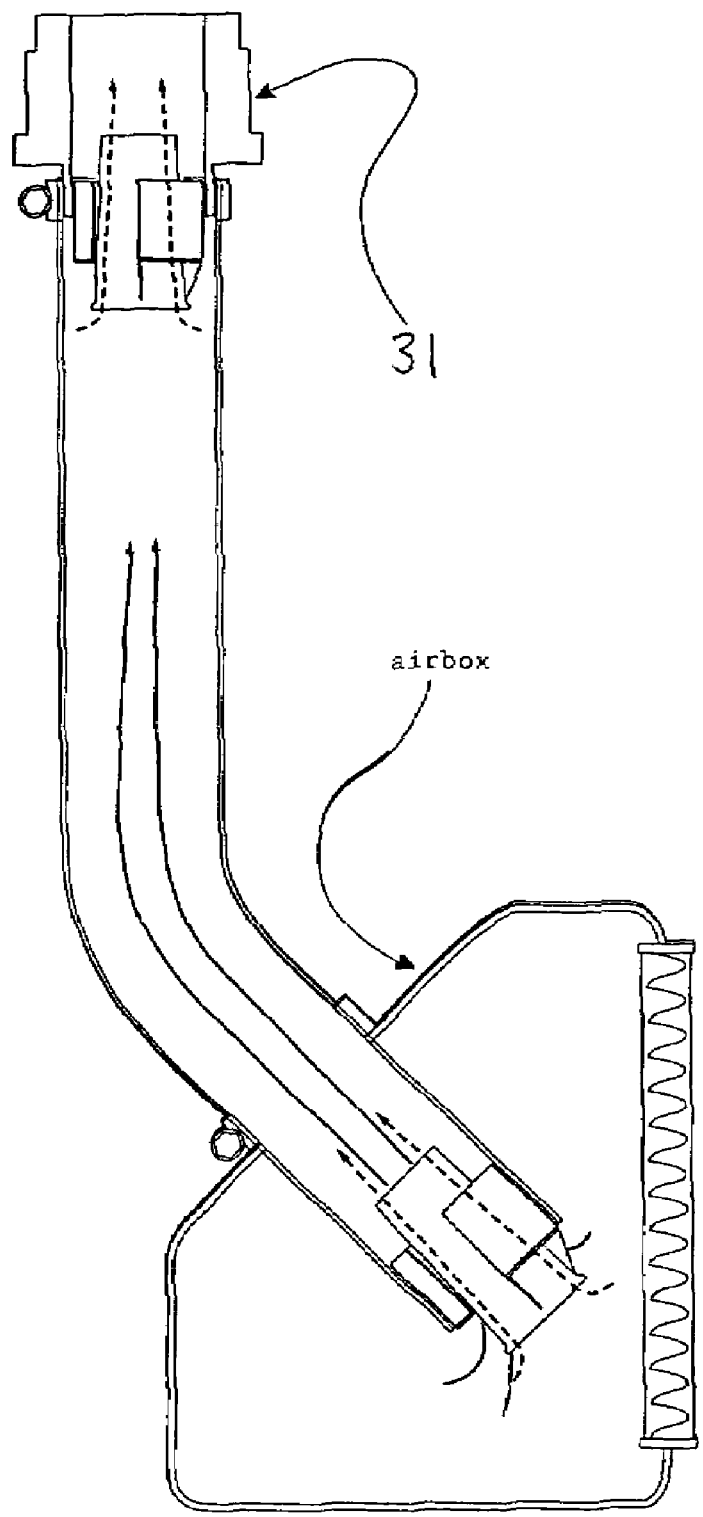
FIG. 12 is a cross sectional view of an air intake pipe having both an air horn of the first embodiment and an air horn of the second embodiment.

FIG. 10 is a cross section of the air intake pipe 40 showing the airflow through the air intake pipe 40 when the air horn 50 is positioned near the intake end of the air intake pipe 40. As shown, placing the air horn 50 at the intake end of the air intake pipe 40 streamlines the air flow through the pipe similarly to when the air horn 50 is placed at the exit end of the air intake pipe 40 (see FIG. 7B). The flange 64 located closer to the inlet 54 than the outlet 56 of the truncated cone 52 stops the air horn 50 from getting pushed too far into the air intake pipe 40. Had the first embodiment of the air horn 50 been used at the intake end of the air intake pipe 40, the air horn 50 would not have been pushed in far enough to be secure. This second embodiment of the air horn 50 may be especially useful when it is inconvenient to place the air horn 50 between the throttle 31 and the air intake pipe 40 because of space limitations. In some situations, it may be desirable to use two air horns—one at the intake end of the intake pipe 40 and another one at the exit end of the intake pipe 40, as shown in FIG. 12.

Figure 11:
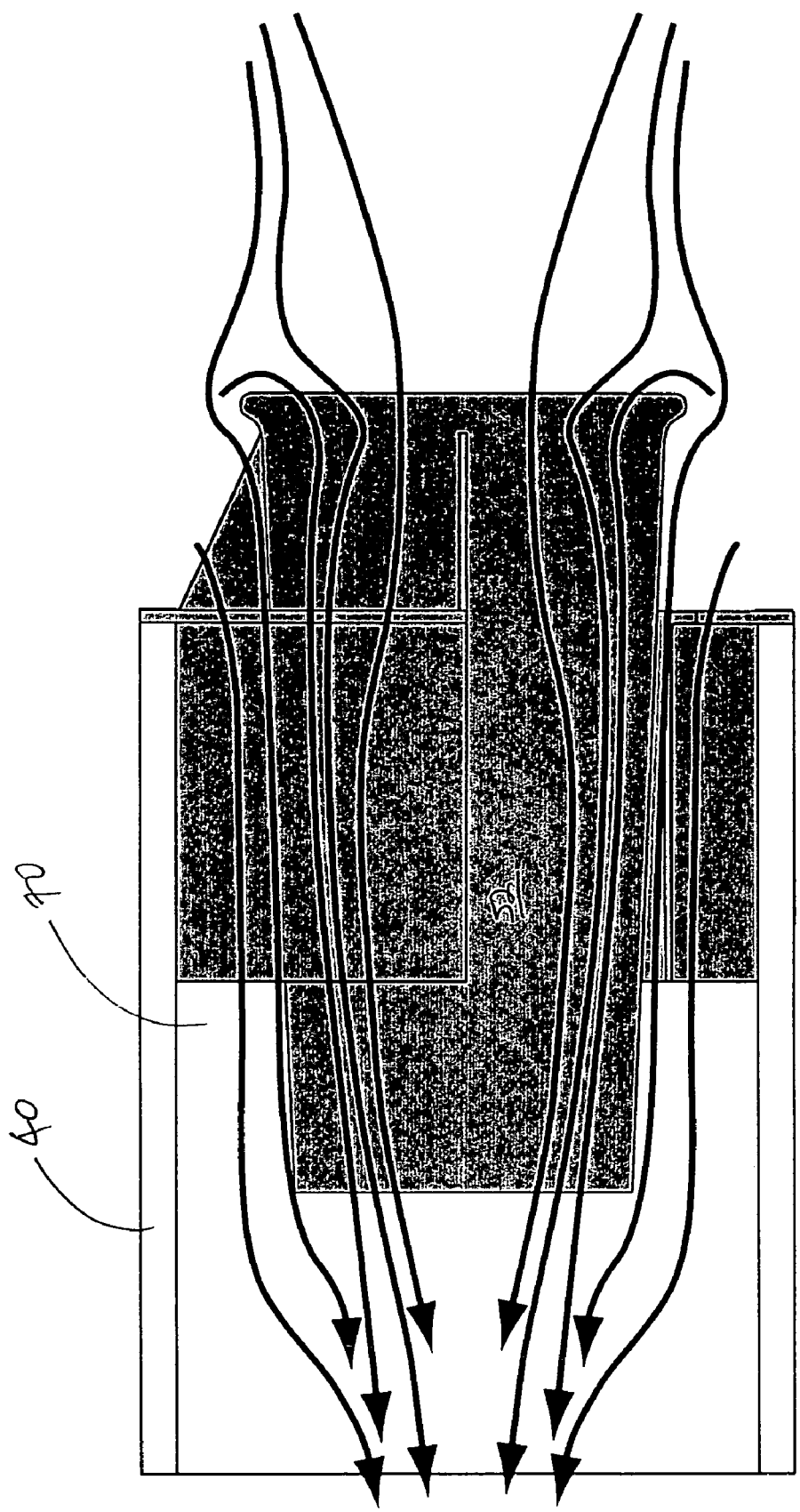
FIG. 11 is a cross sectional view of the interface between the air intake pipe and the air horn placed at the intake end of the air intake pipe.

FIG. 11 is a cross sectional view of the interface between the air intake pipe 40 and the air horn 50 placed at the intake end of the air intake pipe 40. The air flow through the air horn 50 is similar to the air flow that is seen when the air horn 50 is placed near the exit end of the air intake pipe 40. The high-velocity air exiting the truncated cone 52 meets the low-velocity air coming out of the gap 70 and shoots a combined stream of air near the center axis 41 of the air intake pipe 40. This combined, focused stream of air results in a more effective feeding of the air into the gas directing manifold 32, as explained above, increasing the horsepower generated from the internal combustion engine 30.

While the foregoing has been with reference to a particular embodiment of the invention, it will be appreciated by those skilled in the art that changes in this embodiment may be made without departing from the principles and spirit of the invention. For example, the air horn disclosed herein may be used with any types of intake pipe other than one that is part of an automotive system. The scope of the invention is defined by the appended claims.

What is claimed is:

1. A device controlling a flow of a fluid moving through a pipe, the device comprising:
   a truncated cone having a first diameter at an inlet and a second diameter at an outlet, wherein the first diameter is larger than the second diameter; and
   a bracket attached to the truncated cone, wherein the bracket is a curved sheet positioned around at least a part of the truncated cone and having an adjustable bracket diameter, wherein the bracket diameter is measured from a center axis extending through a center of the truncated cone.

2. The device of claim 1, wherein the bracket is a curved sheet that is partially formed around the truncated cone, and wherein the bracket diameter is adjustable by controlling a distance between a first end of the curved sheet and a second end of the curved sheet.

3. The device of claim 1, wherein the first end of the curved sheet is fixed to the truncated cone and the second end is free to be moved to and away from the first end.

4. The device of claim 1 farther comprising a flange protruding from the bracket.

5. The device of claim 4, wherein the flange is positioned on an edge of the bracket that is closest to the outlet of the truncated cone.

6. The device of claim 4, wherein the flange is positioned on an edge of the bracket that is closest to the inlet of the truncated cone.

7. The device of claim 1, wherein the truncated cone has a lip at the inlet to increase the amount of fluid that passes through the truncated cone.

8. The device of claim 1, wherein the first diameter is about 0.5 " larger than the second diameter.

9. The device of claim 1, wherein the truncated cone and the bracket are made of the same material.

10. The device of claim 8, wherein the same material is one of aluminum, stainless steel, and injected plastic.

11. The device of claim 1, wherein the device is designed to partially fit into the pipe and securely attach to the pipe.

12. A fluid flow system comprising:
    a pipe through which the fluid flows;
    a device for controlling a flow of the fluid moving through the pipe, wherein the device is attached to an end of the pipe, the device having:

a truncated cone having a first diameter at an inlet and a second diameter at an outlet, wherein the first diameter is larger than the second diameter; and a bracket attached to the truncated cone, wherein the bracket is a curved sheet positioned around at least a part of the truncated cone and having an adjustable bracket diameter, wherein the bracket diameter is measured from a center axis extending through a center of the truncated cone.

13. The system of claim 12, wherein the device is attached to an exit end of the pipe.

14. The system of claim 13, wherein the device is a first device, further comprising a second device substantially similar to the first device attached to an intake end of the pipe.

15. The system of claim 12, wherein the device is attached to an intake end of the pipe.

16. A method of making a device that controls fluid movement through a pipe, the method comprising:

forming a truncated cone having a first diameter at an inlet and a second diameter at an outlet, wherein the first diameter is larger than the second diameter; and forming a bracket around the truncated cone, wherein the bracket is a curved sheet positioned around at least a part of the truncated cone and having an adjustable bracket diameter, wherein the bracket diameter is measured from a center axis extending through a center of the truncated cone.

17. The method of claim 16 further comprising making the bracket diameter adjustable by fixing a first end of the curved sheet to the truncated cone and leaving a second end of the curved sheet free to be moved to and away from the first end of the curved sheet.

18. The method of claim 16 further comprising forming a flange protruding from the bracket.

19. The method of claim 15, wherein the flange is formed on an edge of the bracket that is closest to the outlet of the truncated cone.

20. The method of claim 15, wherein the flange is formed on an edge of the bracket that is closest to the inlet of the truncated cone.

21. The method of claim 16 further comprising making the first diameter about 0.5 " larger than the second diameter.

22. The method of claim 16 further comprising forming a lip at the inlet of the truncated cone to increase the amount of fluid that passes through the truncated cone.

* * * * *